United States Patent [19]

Barski et al.

[11] Patent Number: 4,791,679
[45] Date of Patent: Dec. 13, 1988

[54] IMAGE CHARACTER ENHANCEMENT USING A STROKE STRENGTHENING KERNAL

[75] Inventors: Lori L. Barski, North Chili; Roger S. Gaborski, Pittsford, both of N.Y.

[73] Assignee: Eastman Kodak Company, Rochester, N.Y.

[21] Appl. No.: 136,065

[22] Filed: Dec. 26, 1988

[51] Int. Cl.[4] .................................................. G06K 9/44
[52] U.S. Cl. ........................................ 382/55; 382/54; 358/166
[58] Field of Search ................... 382/54, 55; 358/166, 358/284

[56] References Cited

U.S. PATENT DOCUMENTS

| | | | |
|---|---|---|---|
| 3,573,789 | 4/1971 | Sharp et al. | 382/54 |
| 3,624,606 | 11/1971 | Lefevre | 382/54 |
| 3,688,266 | 8/1972 | Watanabe et al. | 382/54 |
| 4,010,446 | 3/1977 | Rawa | 382/55 |
| 4,124,870 | 11/1978 | Schatz et al. | 382/54 |
| 4,437,122 | 3/1984 | Walsh et al. | 382/54 |
| 4,703,363 | 10/1987 | Kitamura | 382/55 |

Primary Examiner—Leo H. Boudreau
Assistant Examiner—Donald J. Daley
Attorney, Agent, or Firm—Robert M. Wallace

[57] ABSTRACT

Character stroke is strengthened by processing video image data with a 16×16 kernal, and moving the kernal one pixel at a time through the image. For each pixel position, sections of the kernal, are selectively filled with black pixels in proportion to the number of black pixels in each section, in accordance with a set of predetermined rules.

7 Claims, 2 Drawing Sheets

4,791,679

IMAGE CHARACTER ENHANCEMENT USING A STROKE STRENGTHENING KERNAL

BACKGROUND OF THE INVENTION

When digitizing a medium (paper or film) of low contrast containing alphanumeric characters, quite often the resulting output consists of weak or broken characters. For example, when a document written in light pencil is scanned and digitized, the resulting image may contain broken characters. If the digital signal from the scanner is sent to a processing device such as an optical character recognition (OCR) machine where connectivity of characters is essential to performance, the machine will not be able to perform adequately. The same problem arises when scanning a document printed by a dot matrix printer, where the dots are not connected.

SUMMARY OF THE INVENTION

An object of the invention is to solve this problem by performing stroke strengthening to enhance contrast and to connect broken characters of a binary image. The character stroke is strengthened by processing the image with a 16×16 kernal, moving the kernal one pixel at a time. In each pixel position, the kernal, which is divided into sixteen square sections, is selectively filled with black pixels in proportion to the number of black pixels in each section, in accordance with a special set of rules. The rules are as follows:

1. If the number of black pixels in two neighboring sections are greater than the threshold and the number of black pixels in the section lying between them is greater than half the threshold value, all three sections are filled with all black pixels;

2. If the number of black pixels in each of two neighboring sections is greater than the threshold, then both sections are filled with all black pixels;

3. If the number of black pixels in each of three sections lying along a diagonal is greater than the threshold, then the diagonal regions adjacent the three sections, as well as the sections themselves, are filled with all black pixels;

4. If the number of black pixels in each of two sections arranged along a diagonal is greater than the threshold, then the diagonal regions adjacent the two sections, as well as the sections themselves, are filled with all black pixels; and 5. If the number of black pixels in each of two sections, displaced from one another by a knight's move as in the game of chess, is greater than the threshold and the number of black pixels in a connecting section lying between them is greater than half the threshold, then the connecting section is filled with all black pixels and the diagonal region between the connecting section and one of the other two sections is filled with all black pixels.

Preferably, the kernal comprises 16 columns and 16 rows of video pixels and each section of the kernal is a square of four columns of pixels by four rows of pixels, the kernal comprising 16 such sections arranged in a square array. Each time the data encompassed within a given kernal position is thus processed, the kernal is then moved by one video position (preferably to the next column position) and the entire process is repeated.

DESCRIPTION OF THE DRAWINGS

The invention may be understood by reference to the accompanying drawings, of which.

DETAILED DESCRIPTION

Figure 1:
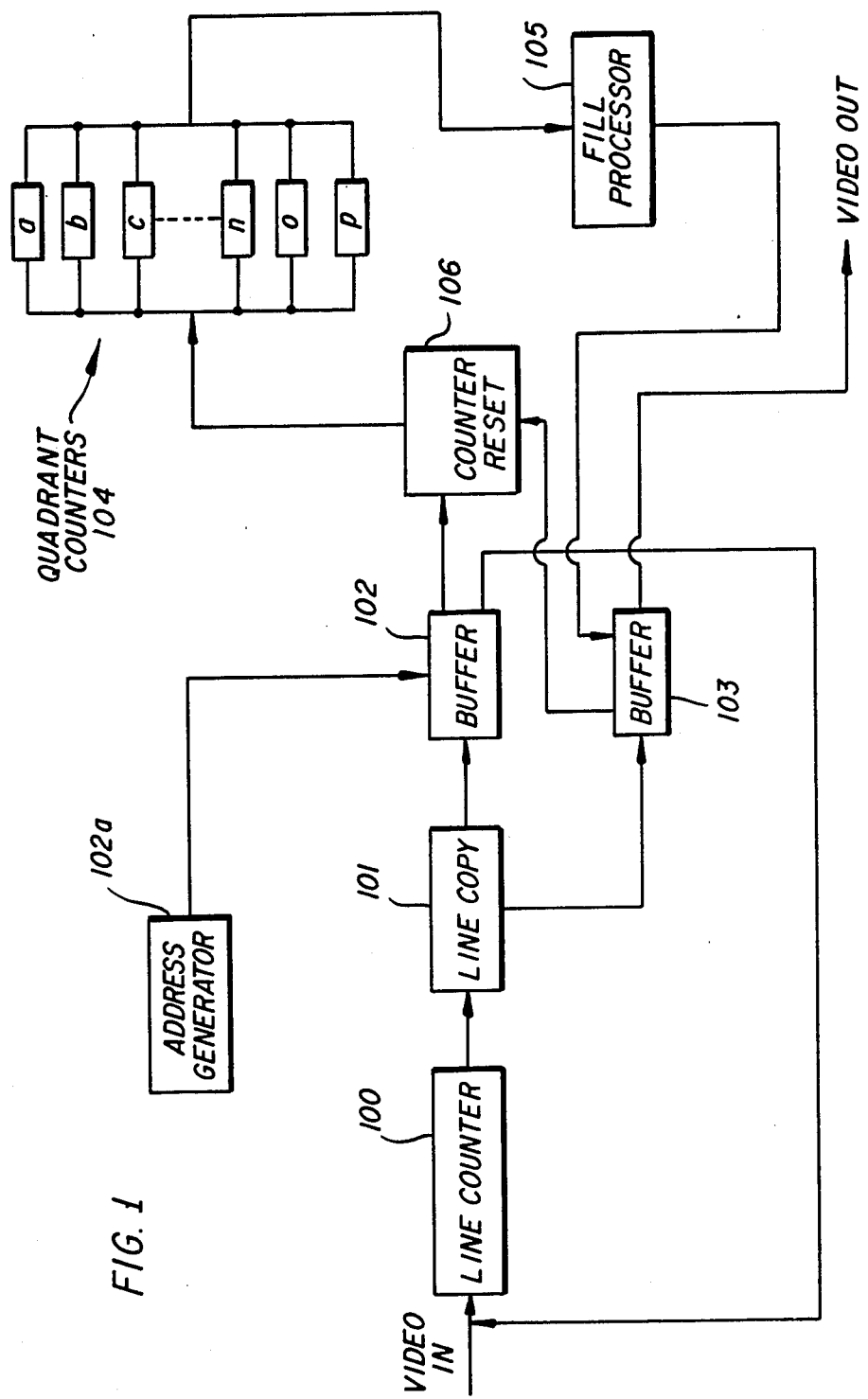
FIG. 1 is a block diagram of the system of the invention.
Figure 2:
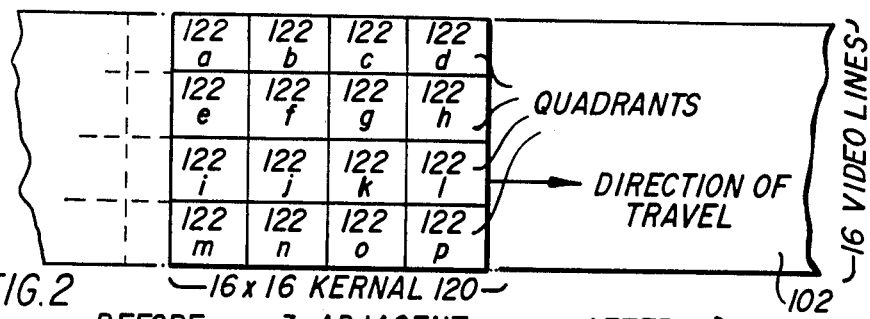
FIG. 2 is a diagram illustrating the 16×16 kernal used in processing the video data in accordance with the invention.
Figure 3A:
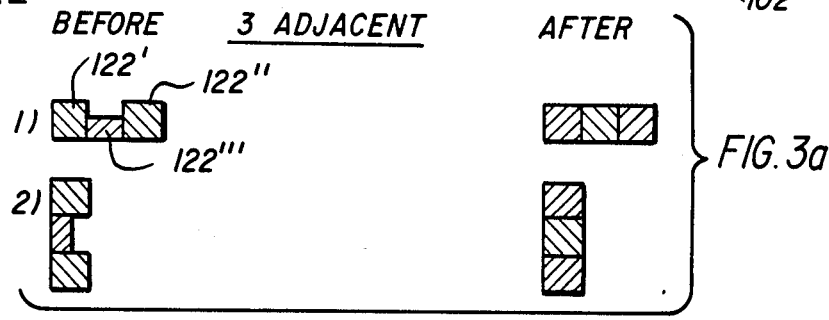
FIGS. 3a–3e illustrate the basic rules for stroke strengthening using the kernal of FIG. 2.
Figure 3B:
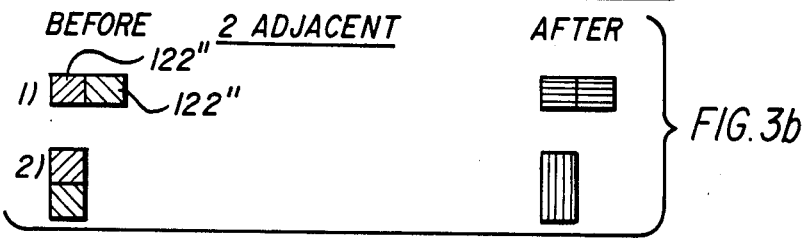
Figure 3C:
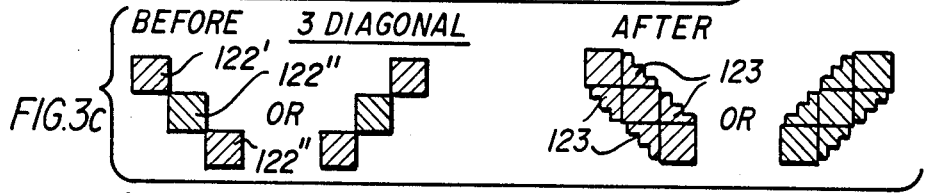
Figure 3D:
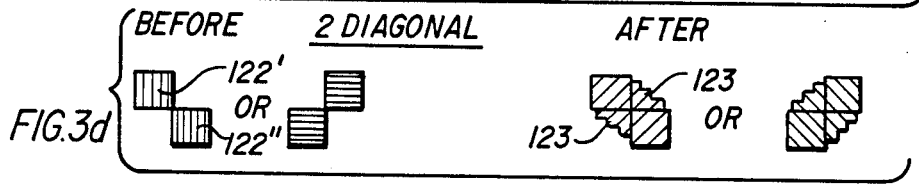
Figure 3E:
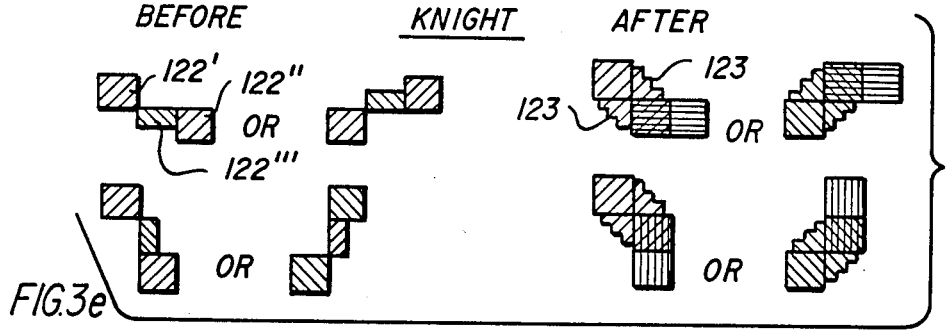

Referring to FIG. 1, lines of incoming video data pass through a line counter 100, get copied by a copy circuit 101 and written to a pair of buffers 102 and 103. The buffers 102 and 103 each hold the same 16 lines of video data (one bit/pixel). The buffer 102 is simply used to hold the original data for counting purposes and is not modified in any way. Image processing is performed on the data stored in the buffer 103. After each new line of video data is shifted into the top row of buffers 102 and 103 (and the oldest line shifted out of the bottom row), a 16×16 kernal 120 (FIG. 2) is "moved" across the 16 lines of the buffer 102, one pixel at a time. For each pixel position, counters 104a–104p count the black pixels in each quadrant 122a–122p of the kernal 120. Each quadrant 122 in the kernal 120 is a 4×4 array of pixels. The 16×16 kernal 120 may be readily implemented (for example) by an address generator 102a which, for a given position of the 16×16 kernal 120 in the 16 video lines of data stored in the buffer 102, reads the 16 columns of pixels encompassed in the 16 video lines by the kernal 120 from the buffer 102 to the counters 106. The counts computed by the counters 106 are then input to a fill processor 105 which performs "filling" by transforming qualifying white pixels to black based upon the following criteria using a predetermined threshold:

(a) Three adjacent case (FIG. 3a):
If the number of black pixels in each of two end quadrants 122', 122" is greater than the threshold and the number of black pixels in the middle quadrant 122''' is greater than half the threshold, fill all three quadrants 122', 122", 122''' with all black pixels;

(b) Two adjacent case (FIG. 3b):
If the number of black pixels in each of two neighboring quadrants 122', 122" is greater than the threshold, fill both quadrants 122', 122" with all black pixels;

(c) Three diagonal case (FIG. 3c):
If the number of black pixels in each of three diagonal quadrants 122', 122", 122''' is greater than the threshold, fill the diagonal regions 123 adjacent the three quadrants 122', 122", 122''', as well as the three quadrants themselves, with all black pixels;

(d) Two diagonal case (FIG. 3d):
If the number of black pixels in each of two diagonal quadrants 122', 122" is greater than the threshold, fill the diagonal regions 123 adjacent the two quadrants 122', 122", as well as the two quadrants themselves, with all black pixels;

(e) The "knight" case (FIG. 3e):
If the number of black pixels in an "n" quadrant 122' is greater than the threshold and the number of black pixels in a "kn" quadrant 122' (i.e., a quadrant located a knight's move away as in the game of chess--or, an "L" displacement) is greater than the threshold and the number of black pixels in the connecting quadrant 122''' between them is greater than half the threshold, treat the connecting quadrant 122''' as an (a) above and treat the diagonal regions 123 adjacent the connecting quadrant as in (d) above.

Once filling is performed while the kernal 120 resides at a given pixel location, the kernal 120 moves horizontally by one pixel, the quadrant counters 104a–104p are reinitialized to zero via a circuit 106, the quadrant counts are taken again and the data is modified as before. The process is repeated until the kernal 120 reaches the end of the line data. (At this point the first line of modified data in buffer 103 is written out.) In the buffers 102, 103, the video lines are shifted down one line and a new line of video data is brought into the buffer 102 and copied into the buffer 103. This entire process is repeated until there are no more available lines of video data, at which point the buffer 103 is empty (written out) and the process terminates.

The threshold value employed in the processing rules (a) through (e) above may be chosen, for example, to be one-half the number of pixels in a given quadrant (i.e., 8 in the present example).

Other embodiments of the invention may use, in general, an N by M kernal, where an N and M are other than 16 pixels, (e.g. 32×32 or 8×8, or etc . . . ).

Accordingly, while the invention has been described in detail with specific reference to a preferred embodiment thereof, variations and modifications thereof may be made without departing from the spirit and scope of the invention.

What is claimed is:

1. A process performed by image processing means for strengthening weak or broken characters in an image represented by binary pixels of video data, said process comprising:
   locating a kernal of N rows and M columns of pixels in a particular position in said image;
   counting the number of black pixels in each section of n columns by m rows of pixels in said kernal;
   comparing the number of black pixels in each of said sections with a threshold, said threshold being around one-half the maximum possible number of black pixels in said section;
   selecting certain ones of said sections for transformation to a high percentage of black pixels so that those white pixels within one of or near to neighboring sections whose black pixel counts are sufficiently large are transformed to black pixels; and
   moving said kernal to the next adjacent pixel position, and repeating the foregoing process,
   wherein said selecting step selects said certain sections in accordance with the following set of rules:
   (a) if the number of black pixels in two end sections is greater than said threshold and the number of black pixels in the middle section is greater than half the threshold, fill the three sections with black pixels;
   (b) if the number of black pixels in each of two neighboring sections is greater than said threshold, fill said neighboring sections with black pixels;
   (c) if the number of black pixels in each of the three diagonally disposed sections is greater than said threshold, fill diagonal regions adjacent the three diagonally disposed sections, as well as the three diagonally disposed sections themselves, with black pixels;
   (d) if the number of black pixels in each of the two diagonally disposed sections is greater than said threshold, fill diagonal regions adjacent the two diagonally disposed sections, as well as the two diagonally disposed sections themselves, with black pixels; and
   (e) if the number of black pixels in a first section is greater than said threshold and the number of black pixels in a second section disposed with respect to said first section by an "L" displacement is greater than said threshold and the number of black pixels in a connecting section between said first and second sections is greater than half said threshold, treat said connecting section as in (a) above and treat the diagonal regions adjacent said connecting section as in (d) above.

2. The process of claim 1 wherein said high percentage is about 100%.

3. The process of claim 1 wherein M and N are each 16 and m and n are each 4.

4. An image processing system adapted to strengthen weak or broken characters in an image represented by binary pixels of video data, said system comprising:
   means for locating a kernal of N rows and M columns of pixels in a particular position in said image;
   means for counting the number of black pixels in each section of n columns by m rows of pixels in said kernal;
   means for comparing the number of black pixels in each of said sections with a threshold;
   means for selecting certain ones of said sections for transformation to a high percentage of black pixels so that those white pixels within one or near two neighboring sections whose black pixel counts are sufficiently large are transformed to black pixels; and
   means for moving said kernal to the next adjacent pixel position whenever said selecting means has transformed all qualifying sections in said kernal,
   wherein said selecting means selects said certain sections in accordance with the following set of rules:
   (a) if the number of black pixels in two end sections is greater than a threshold and the number of black pixels in the middle section is greater than half said threshold, fill the three sections with black pixels;
   (b) if the number of black pixels in each of two neighboring sections is greater than said threshold, fill said neighboring sections with black pixels;
   (c) if the number of black pixels in each of the three diagonally disposed sections is greater than said threshold, fill diagonal regions adjacent the three diagonally disposed sections, as well as the three diagonally disposed sections themselves, with black pixels;
   (d) if the number of black pixels in each of the two diagonally disposed sections is greater than said threshold, fill diagonal regions adjacent the two diagonally disposed sections, as well as the two diagonally disposed sections themselves, with black pixels; and
   (e) if the number of black pixels in a first section is greater than said threshold and the number of black pixels in a second section disposed with respect to said first section by an "L" displacement is greater than said threshold and the number of black pixels in a connecting section between said first and second sections is greater than half said threshold, treat said connecting section as in (a) above and treat the diagonal regions adjacent said connecting section as in (d) above.

5. The system of claim 4 wherein said high percentage is at least nearly 100%.

6. A character enhancement image processing system, comprising:

buffer means for storing N rows of video data;

means for loading an incoming row of video data into said buffer means while unloading the $N^{th}$ one of said rows out of said buffer means:

addressing means for addressing an MxN kernal of M co-extensive columns of video pixels in said N lines of data and reading nxm quadrants of video pixels included within said kernal out of said buffer means, said kernal being characterized by a columnar position of said M co-extensive columns within said N rows;

counter means for counting the number of black pixels in each one of said quadrants of video pixels;

blackening means responsive to a comparison of the number of black pixels in each of said quadrants with a threshold value for converting at least some of the white pixels in certain of said quadrants to black pixels in such a manner as to enhance the connectivity of alphanumeric characters represented by said video data; and kernal means responsive whenever said blackening means has completed the conversion of said certain quadrants for a given columnar position of said kernal for moving said columnar position of said kernal by one column of video pixels, wherein said blackening means identifies said certain quadrants in accordance with the following set of rules:

(a) if the number of black pixels in two end sections is greater than said threshold and the number of black pixels in the middle section is greater than half the threshold, fill the three sections with black pixels;

(b) if the number of black pixels in each of two neighboring sections is greater than said threshold, fill said neighboring sections with black pixels;

(c) if the number of black pixels in each of the three diagonally disposed sections is greater than said threshold, fill diagonal regions adjacent the three diagonally disposed sections, as well as the three diagonally disposed sections themselves, with black pixels;

(d) if the number of black pixels in each of the two diagonally disposed sections is greater than said threshold, fill diagonal regions adjacent the two diagonally disposed sections, as well as the two diagonally disposed sections themselves, with black pixels; and (e) if the number of black pixels in a first section is greater than said threshold and the number of black pixels in a second section disposed with respect to said first section by an "L" displacement is greater than said threshold and the number of black pixels in a connecting section between said first and second sections is greater than half said threshold, treat said connecting section as in (a) above and treat the diagonal regions adjacent said connecting section as in (d) above.

7. The system of claim 6 wherein said blackening means converts all of the white pixels in said certain quadrants to black pixels.

* * * * *